(12) United States Patent
Kaessner et al.

(10) Patent No.: US 8,882,195 B2
(45) Date of Patent: Nov. 11, 2014

(54) BASE FOR A PERSON'S SEAT (75) Inventors: Dirk Kaessner, Kuemmersbruck (DE); Wolfgang Beier, Rieden (DE); Andreas Vogl, Teublitz (DE); Alfred Weidinger, Sonnen (DE)

(73) Assignee: Grammer AG, Amberg (DE)

( * ) Notice: Subject to any disclaimer, the term of this patent is extended or adjusted under 35 U.S.C. 154(b) by 149 days.

(21) Appl. No.: 13/296,538

(22) Filed: Nov. 15, 2011

(65) Prior Publication Data

US 2012/0126592 A1 May 24, 2012

(30) Foreign Application Priority Data

Nov. 16, 2010 (DE) .......................... 10 2010 051 325

(51) Int. Cl.
B60N 2/42 (2006.01)
B60N 2/427 (2006.01)

(52) U.S. Cl.
CPC ........ B60N 2/42736 (2013.01); B60N 2/42709 (2013.01)
USPC .................................. 297/216.2; 297/216.19

(58) Field of Classification Search
USPC ............... 297/216.1, 216.15, 216.16, 216.17, 297/216.18, 216.19, 216.2
See application file for complete search history.

(56) References Cited

U.S. PATENT DOCUMENTS

| | | | |
|---|---|---|---|
| 2,118,456 A | 5/1938 | Whedon | |
| 3,300,203 A | 1/1967 | Carter et al. | |
| 3,460,791 A * | 8/1969 | Judd | 248/188.91 |
| 3,531,154 A * | 9/1970 | Fleche | 296/68.1 |
| 3,704,767 A | 12/1972 | Takagi | |
| 3,706,362 A | 12/1972 | Faure | |
| 3,752,432 A | 8/1973 | Lowe | |
| 4,151,973 A | 5/1979 | Sedlock | |
| 4,213,594 A | 7/1980 | Pietsch et al. | |

(Continued)

FOREIGN PATENT DOCUMENTS

| | | |
|---|---|---|
| CN | 1668489 A | 9/2005 |
| CN | 100493951 C | 6/2009 |

(Continued)

OTHER PUBLICATIONS

European Search Report for European Patent Application No. 12 159 863.5, mailed Jul. 10, 2013.

(Continued)

*Primary Examiner* — David R Dunn
*Assistant Examiner* — Alexander Harrison
(74) *Attorney, Agent, or Firm* — Lathrop & Gage LLP (57) ABSTRACT

A seat base having a first pair of U-shaped tubular elements capable of being deformed, the upper end portion is arranged in a torsionally rigid manner in the vertical direction on a lower surface of the seat part and the lower end portion is arranged in a torsionally rigid manner in the vertical direction on an upper surface of a region of the vehicle floor, and a second pair of S-shaped tubular elements capable of being deformed, the upper end portion is arranged in a torsionally rigid manner in the vertical direction on the lower surface of the seat part and the lower end portion is arranged in a torsionally rigid manner in the vertical direction on the upper surface of the region of the vehicle floor, wherein the first pair of elements is arranged substantially in front of the second pair of elements in the direction of the seat.

14 Claims, 4 Drawing Sheets

(56) References Cited

U.S. PATENT DOCUMENTS

| | | | |
|---|---|---|---|
| 4,286,765 A | 9/1981 | Delgleize et al. | |
| 4,350,317 A | 9/1982 | Aondetto | |
| 4,408,744 A | 10/1983 | Thompson | |
| 4,451,079 A | 5/1984 | Takahashi | |
| 4,477,050 A | 10/1984 | Thompson et al. | |
| 4,573,657 A | 3/1986 | Sakamoto | |
| 4,645,169 A | 2/1987 | Mischer | |
| 4,679,760 A | 7/1987 | Dotzler et al. | |
| 4,684,100 A | 8/1987 | Grassl | |
| 4,718,719 A * | 1/1988 | Brennan | 297/216.2 |
| 4,729,539 A | 3/1988 | Nagata | |
| 4,773,671 A | 9/1988 | Inagaki | |
| 4,784,434 A | 11/1988 | Iwami | |
| 4,856,763 A | 8/1989 | Brodersen et al. | |
| 4,943,037 A | 7/1990 | Brodersen et al. | |
| 4,961,482 A | 10/1990 | Pohlenz et al. | |
| 4,993,778 A | 2/1991 | Colin et al. | |
| 5,058,852 A | 10/1991 | Meier et al. | |
| 5,125,631 A | 6/1992 | Brodersen et al. | |
| 5,152,578 A | 10/1992 | Kiguchi | |
| 5,211,369 A | 5/1993 | Hoemer | |
| 5,251,864 A | 10/1993 | Itou | |
| 5,364,060 A | 11/1994 | Donovan et al. | |
| 5,521,821 A | 5/1996 | Shimizu et al. | |
| 5,533,703 A | 7/1996 | Grassl et al. | |
| 5,553,911 A | 9/1996 | Bodin et al. | |
| 5,582,385 A | 12/1996 | Boyle et al. | |
| 5,735,509 A | 4/1998 | Gryp et al. | |
| 5,765,802 A | 6/1998 | Bostrom et al. | |
| 5,788,185 A * | 8/1998 | Hooper | 244/122 R |
| 5,791,738 A | 8/1998 | Niezoldt | |
| 5,794,911 A | 8/1998 | Hill | |
| 5,871,198 A | 2/1999 | Bostrom et al. | |
| 5,957,426 A | 9/1999 | Brodersen | |
| 5,967,604 A | 10/1999 | Yoshida et al. | |
| 5,971,116 A | 10/1999 | Franklin | |
| 6,042,093 A | 3/2000 | Garelick | |
| 6,340,201 B1 | 1/2002 | Higuchi | |
| 6,478,102 B1 | 11/2002 | Puterbaugh et al. | |
| 6,543,755 B2 | 4/2003 | Monson et al. | |
| 6,616,116 B1 | 9/2003 | Rochau et al. | |
| 6,637,735 B2 | 10/2003 | Monson et al. | |
| 6,763,550 B2 | 7/2004 | Regnier | |
| 6,802,408 B2 | 10/2004 | Krammer | |
| 7,044,553 B2 | 5/2006 | Ropp | |
| 7,152,839 B2 | 12/2006 | Mullinix et al. | |
| 7,168,671 B2 | 1/2007 | Bostrom et al. | |
| 7,185,867 B2 | 3/2007 | Hill et al. | |
| 7,377,533 B2 | 5/2008 | Takeuchi et al. | |
| 7,712,836 B2 | 5/2010 | Deml | |
| 7,810,884 B2 | 10/2010 | Lorey et al. | |
| 7,886,882 B2 | 2/2011 | Behmenburg et al. | |
| 7,942,248 B2 | 5/2011 | St. Clair et al. | |
| 8,118,287 B2 | 2/2012 | Schordine | |
| 8,457,841 B2 | 6/2013 | Knoll et al. | |
| 2001/0035600 A1 | 11/2001 | St. Clair | |
| 2002/0011699 A1 | 1/2002 | St.Clair | |
| 2006/0243548 A1 | 11/2006 | Stein et al. | |
| 2006/0278805 A1 | 12/2006 | Haller | |
| 2007/0278723 A1 | 12/2007 | Shoemaker et al. | |
| 2008/0000738 A1 | 1/2008 | Zdeb | |
| 2008/0000739 A1 | 1/2008 | Behmenburg et al. | |
| 2008/0088165 A1 | 4/2008 | Deml | |
| 2008/0156602 A1 | 7/2008 | Hiemenz et al. | |
| 2008/0197684 A1 | 8/2008 | Ott et al. | |
| 2009/0134595 A1 | 5/2009 | Haller et al. | |
| 2009/0179390 A1 | 7/2009 | Wurmthaler et al. | |
| 2009/0184448 A1 | 7/2009 | Hiser | |
| 2009/0256293 A1 | 10/2009 | Ward | |
| 2009/0283944 A1 | 11/2009 | Schordine | |
| 2010/0052356 A1 | 3/2010 | Lewis, II | |
| 2010/0072685 A1 | 3/2010 | Golpe et al. | |
| 2010/0072800 A1 | 3/2010 | Weber et al. | |
| 2010/0102493 A1 | 4/2010 | Deml et al. | |
| 2010/0117428 A1 | 5/2010 | Deml et al. | |
| 2011/0001033 A1 | 1/2011 | Kohl et al. | |
| 2011/0001342 A1 | 1/2011 | Deml et al. | |
| 2011/0022265 A1 | 1/2011 | Sekiya | |
| 2011/0226930 A1 | 9/2011 | Enns et al. | |
| 2011/0278894 A1 | 11/2011 | Lorey | |
| 2012/0025577 A1 | 2/2012 | Kolb | |
| 2012/0043798 A1 | 2/2012 | Haller et al. | |
| 2012/0049421 A1 | 3/2012 | Haller et al. | |
| 2012/0086159 A1 | 4/2012 | Kolb | |
| 2012/0090930 A1 | 4/2012 | Haller | |
| 2012/0091773 A1 | 4/2012 | Lorey | |
| 2012/0126592 A1 | 5/2012 | Kaessner et al. | |
| 2012/0153689 A1 | 6/2012 | Haller et al. | |
| 2012/0153695 A1 | 6/2012 | Haller et al. | |
| 2012/0187615 A1 | 7/2012 | Haller et al. | |

FOREIGN PATENT DOCUMENTS

| | | |
|---|---|---|
| DE | 1 898 307 U | 8/1964 |
| DE | 15 55 056 | 3/1970 |
| DE | 19 16 403 A1 | 10/1970 |
| DE | 2022021 | 11/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 35 17 345 A1 | 11/1986 |
| DE | 3813402 | 11/1989 |
| DE | 38 24 272 A1 | 3/1990 |
| DE | 41 01 221 A1 | 7/1992 |
| DE | 4120608 | 1/1993 |
| DE | 9402417 | 4/1994 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 | 5/2004 |
| DE | 10347219 | 5/2005 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 602005001868 | 12/2007 |
| DE | 10 2007 030 467 A1 | 1/2009 |
| DE | 102008040011 | 5/2009 |
| DE | 10 2008 016 685 B3 | 6/2009 |
| DE | 10 2008 010 719 A1 | 8/2009 |
| DE | 10 2008 045 492 A1 | 3/2010 |
| DE | 10 2008 052 960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 1552981 | 7/2005 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 6218346 A | 1/1987 |
| JP | 6218347 A | 1/1987 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Office Action for German patent application No. 10 2010 048 210.2, mailed Jul. 7, 2011.

Office Action for German Patent Application No. 10 2010 055 342.5, mailed Oct. 6, 2011.

(56) References Cited

OTHER PUBLICATIONS

Extended European Search Report for parallel European Patent Application No. 11 19 5031, mailed Apr. 5, 2012.
Office Action for German Patent Application No. 10 2010 055 344.1, mailed Oct. 5, 2011.
Examination Report dated Aug. 24, 2012, from the German Patent Office for German Patent Application No. 10 2010 026 569.1.
First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Extended European Search Report for parallel European Patent Application No. 11 19 5039, mailed Apr. 5, 2012.
Examination Report for German Patent Application No. 10 2011 009 530.6 dated May 4, 2012.
Extended European Search Report for European Patent Application No. 12 15 9863, dated Jul. 4, 2012.
Office Action for German Patent Application No. 10 2011 015 364.0, mailed Feb. 6, 2012.
Search Report for European Patent Application No. 11177689.4, mailed Dec. 14, 2011.
Office Action for German Patent Application No. 10 2010 035 888.6 mailed Jun. 9, 2011.
Office Action for German patent application No. 10 2010 051 325.3, mailed Oct. 10, 2011.
Office Action corresponding to German Patent Application No. 102010045114.2, completed Nov. 8, 2013.
First Office Action dated Apr. 1, 2014, corresponding to Chinese Patent Application No. 201110364169.1.
Office Action corresponding to German Patent Application No. 10 2010 055 344.1, dated Mar. 13, 2014.

* cited by examiner

BASE FOR A PERSON'S SEAT

CROSS-REFERENCE TO RELATED APPLICATION

This application claims the benefit of priority from German Patent Application No. 10 2010 051 325.3, filed on Nov. 16, 2010, which is hereby incorporated by reference in its entirety.

DESCRIPTION

The present invention relates to a base for a person's seat with at least one backrest and one seat part according to the preamble of claim 1.

The majority of persons' seats or passenger seats known from the prior art have a base, by means of which the seat area is arranged at a distance from the region of the vehicle floor on which the seat is arranged. Bases of this type can have very widely differing designs and can comprise for example two pairs of braces intersecting in each case.

In addition to the comfort of the passenger, in the development of persons' seats and in the case of their bases, the focus has been above all on their safety, in the event for example of a rear-end collision. In this way, it is necessary to develop seat bases which for example compensate the movement energy of the seat in the event of an accident in such a way that for example the person sitting on the seat is carried or held by the seat even during the accident.

Even today, however, a number of persons' seats still have bases which for example can break out of their retaining means or even completely break apart during an accident, so that the seat can consequently no longer have a connection to the vehicle floor and, as a result, can become a lethal deathtrap for the person sitting on the seat as well as also for all the persons present in the immediate vicinity of the seat. These seat bases or seats which are rigid in this way can consequently seriously endanger the life of the person sitting on the seat.

Accordingly, the object of the present invention is to make available a base for a person's seat which will permit a controlled movement of the person's seat in the event of an accident, as a result of which the kinetic energy, which acts upon the person sitting on the seat as well as upon the entire structure of the seat, can be dissipated or converted by the seat base, the seat base itself being simple in design and inexpensive to produce on account of a reduced number of acting components.

This object is attained by the present invention by means of a base for persons' seats with at least one backrest and one seat part according to claim 1.

The base of a person's seat according to the invention with at least one backrest and one seat part permits a controlled movement of the person's seat for the dissipation of kinetic energy and for the protection of the person sitting on the person's seat in the event of an accident taking place substantially in the direction of the seat.

This seat base is characterized by at least one first pair of U-shaped tubular elements capable of being deformed, the upper end portion, with regard to the height (preferably vertical) direction of the seat, is arranged in a torsionally rigid manner substantially on a lower surface of the seat part and the lower end portion, with regard to the height (preferably vertical) direction of the seat, is arranged in a torsionally rigid manner substantially on an upper surface of a region of the vehicle floor on which the person's seat is arranged, and at least one second pair of S-shaped tubular elements capable of being deformed, the upper end portion of which in the height/vertical direction of the seat is arranged in a torsionally rigid manner substantially on the lower surface of the seat part and the lower end portion of which in the height/vertical direction of the seat is arranged in a torsionally rigid manner substantially on the upper surface of the region of the vehicle floor. In this case the first pair of elements are arranged substantially in front of the second pair of elements in the direction of the seat.

It is also possible for the first pair of elements to be arranged substantially behind the second pair of elements in the direction of the seat.

In addition, it is possible that, instead of the U-shaped or S-shaped elements, elements bent in a different manner from them, such as for example in an L-shape or in a W-shape etc., can also be used, which make it possible for the kinetic energy which arises in the event of a crash or accident and in particular in the event of a rear-end collision to be dissipated.

This means that the seat base will withstand the forces acting upon it and, in particular, the kinetic energy arising from an accident and acting upon the seat base, so that the seat base will not break or burst apart or buckle or the like and that, in addition, the seat base will be deformed in a sufficiently controlled manner.

Accordingly, the S-shaped and U-shaped pairs of elements form the bases of the person's seat or passenger seat or vehicle seat respectively, this seat preferably being a static seat which is used for example in a public means of transport, such as for example a bus, an aircraft or a tram, or a utility vehicle, such as for example a tractor. It is also possible, however, for the person's seat according to the invention to be arranged in a passenger car, in which case however this seat is preferably not a static seat.

On account of the arrangement of the individual pairs of elements, an absorption or dissipation or a conversion of the kinetic energy is consequently made possible in the event for example of a rear-end collision of the vehicle, as a result of which the person sitting on the seat is additionally supported by the seat and is consequently also protected, and the seat remains anchored with the surface of the vehicle floor in such a way that there is no risk of injury from the person's seat itself.

It is preferable for the individual elements of the first and second pairs of elements to be arranged at a distance from one another in each case in the width direction of the seat.

This means that one S-shaped and one U-shaped element are arranged in each case on one side of the person's seat in order to be able to support the seat completely.

In addition, in a preferred embodiment the seat base according to the invention has at least one safety element extending substantially at a right angle between the seat part and the surface of the vehicle floor in order to absorb kinetic energy.

This safety element is arranged preferably behind the second pair of elements, i.e. behind the S-shaped pair of elements, in the direction of the seat. It is also possible, however, for the safety element to be arranged in front of the first pair of elements, i.e. in front of the U-shaped pair of elements, in the direction of the seat. It is additionally possible for the safety element to be arranged between the two pairs of elements, i.e. between the U-shaped pair of elements and the S-shaped pair of elements, in the direction of the seat or even in a manner capable of being freely selected in any desired region of the seat.

In addition, it should be noted that the safety element which is arranged behind the S-shaped pair of elements in the direction of the seat, is preferably used as a traction element, in which case the safety element which is arranged in front of the U-shaped pair of elements in the direction of the seat is preferably used as a thrust element. Consequently the safety element which is arranged between the U-shaped and the S-shaped pairs of elements in the direction of the seat is preferably used as a traction and thrust element.

It is further possible, instead of using one safety element as described above, for two safety elements to be used, which in accordance with the arrangement specified above can be arranged along the seat or the seat part in the direction of the seat, in which case for example the two safety elements are situated at a distance from each other in the width direction of the seat in such a way that one safety element is attached to each side of the seat.

In addition, it is also possible for one safety element to be arranged for example behind the S-shaped pair of elements in the direction of the seat and for a second safety element to be arranged in front of the U-shaped pair of elements in the direction of the seat.

As a result, it is also possible, instead of two safety elements, for three safety elements or more to be used, which can be arranged in different regions of the seat or the seat part, provided that the safety elements extend substantially from the lower surface of the seat part as far as the upper surface of the region of the vehicle floor on which the seat is arranged.

Consequently the seat base according to the invention is not restricted to one number of the safety elements and/or to one defined arrangement of the safety elements in the direction of the seat.

In a further preferred embodiment the safety element is capable of being deformed in a plastic manner in such a way that at least one region of the safety element is capable of being stretched in the longitudinal direction of the safety element.

Safety elements capable of being deformed in a plastic manner in this way are for example a flat bar, a sheet metal strip, a secondary belt, a chain belt, a link belt, a perforated belt and/or a wire cable.

In another embodiment it is also possible for the safety element to be capable of being deformed in a resilient manner and thus to be converted back essentially into its original state for example after an accident. Resilient safety elements of this type are for example a rubber belt and/or a belt strap which possibly additionally has or have a wind-up and/or tensioning apparatus.

Further safety elements which can alternatively be used are for example a leather belt, a traction cable, a wire cable, a gas or air spring, a damping element, a metallic profile member, a plastics material element, a casting element, a hinge, an active system, a tightener system, such as for example a belt tightener or pyrotechnics, an electric motor, a linear guide, adjustment rails etc.

The safety elements or intercepting elements are preferably used as "secondary elements" or "secondary belts" which in co-operation with the U-shaped and S-shaped elements permit a controlled movement of the person's seat.

In a further preferred embodiment the lower end portion of the S-shaped element in the vertical direction of the seat extends substantially forwards in the direction of the seat and the upper end portion of the S-shaped element in the vertical direction of the seat extends substantially towards the rear in the direction of the seat.

As a result of this arrangement of the S-shaped elements it is possible for the seat part or the seat area together with the backrest—for example during an accident and provided that the person's seat is orientated in the direction of travel—to be moved forwards slightly in the direction of the seat on the one hand, whereas the rear area of the seat part in the direction of the seat moves slightly upwards and consequently the front area of the seat part in the direction of the seat moves slightly downwards.

In addition, the two end portions of the respective U-shaped elements extend preferably substantially towards the rear in the direction of the seat, as a result of which the movement of the seat part described above is assisted and consequently the kinetic energy which acts upon the person sitting on the seat in the event of an accident can be absorbed in an optimum manner by the seat or the seat base according to the invention.

Consequently, in a preferred embodiment the U-shaped elements of the first pair of elements are capable of being deformed in a plastic manner in each case in such a way that a distance between the respective upper and lower end portions is essentially capable of being reduced and a length of the respective lower end portion which is situated substantially on the upper surface of the floor region of the vehicle is capable of being extended, so that a lower region of a bulging portion of the U-shaped elements is capable of being rolled on the upper surface of the floor region of the vehicle.

In addition, the S-shaped elements of the second pair of elements are preferably capable of being deformed in a plastic manner in each case in such a way that a distance between the respective upper and lower end portions is essentially capable of being widened and an upper S-curve is preferably capable of being pulled up in each case.

This means that in the event of an accident or a crash the U-shaped elements are consequently substantially compressed, so that the length extending in the vertical direction of the seat is reduced, whereas the length extending in the direction of the seat is extended. As a result, the length of the lower end portion in the vertical direction of the seat, which end portion is arranged on a floor region of the vehicle or on a rail which is attached to a floor region of the vehicle, and extends substantially parallel to the floor region of the vehicle, is lengthened. This means that a lower region of the elements is moved closer to the floor region of the vehicle or is pressed against the latter by the pressing force applied. The U-shaped elements are accordingly deformed in a plastic manner.

In addition, the S-shaped elements are also deformed in a plastic manner substantially at the same time, as these elements are substantially bent on account of the tensile forces which occur in the event of an accident of the rear region in the direction of the seat. It is preferable for the upper S-curve in the vertical direction of the seat to bend, whereas the lower S-curve in the direction of the seat is slightly compressed.

In order to be able to carry out this plastic deformation of these pairs of elements, the pairs of elements are arranged with the upper end portion thereof in the direction of the seat in a torsionally rigid manner on the lower surface of the seat part and with the lower end portions thereof in the direction of the seat directly or indirectly against the upper surface of the vehicle floor.

This means that the elements are either fastened directly to the seat part and the vehicle floor (a direct manner) or connected for example by way of a rail system or a turntable or the like indirectly to the seat part and the vehicle floor (an indirect manner).

In all the embodiments specified the individual end portions of the elements are preferably fastened in a fixed manner between the seat part and the vehicle floor in such a way that they cannot be rotated or displaced at their fastening points either in the width direction of the seat, or in the vertical direction of the seat or in the direction of the seat.

The elements are fastened for example by welding joins and/or screw connections, but no connecting technique should be stipulated in this case.

In a preferred embodiment the elements of the first and/or the second pair of elements are tubes having a square cross-section.

This means that the elements are preferably thin-walled hollow bodies which can also have for example a round, oval or polygonal cross-section.

On account of the contour of the tubes, the cross-section of the tubes, the thickness of the walls and/or the quality of the material as well as on account of deliberate impressions and/or beadings etc. of the elements of the seat base, it is possible for the degree of deformation to be adapted in a purposeful manner, so that the seat base according to the invention can be used in a flexible manner for different types of seats, structural spaces, crash profiles and/or customer requirements.

As a result, the seat according to the invention is accordingly preferably characterized by a simple tube design which is arranged systematically in front and at the rear in the seat direction and which preferably co-operates with the safety element or the safety elements respectively.

In a further embodiment the U-shaped element of the first pair of elements and the S-shaped element of the second pair of elements are produced from a continuous metal profile.

This means that one U-shaped element and one S-shaped element in each case are produced or bent from the same tube. As a result, it is possible for example for the torsionally rigid arrangement of the elements to be assisted and for the rigidity of the tube structure as a whole to be increased.

Further advantages, aims and properties of the present invention are explained with reference to the following description of accompanying drawings, in which a person's seat with an embodiment of the seat bases according to the invention are illustrated by way of example.

Components which correspond at least substantially with respect to their function in the figures can be designated with the same references in this case, it being unnecessary for these components to be designated or explained in all the figures. In the figures

Figure 1:
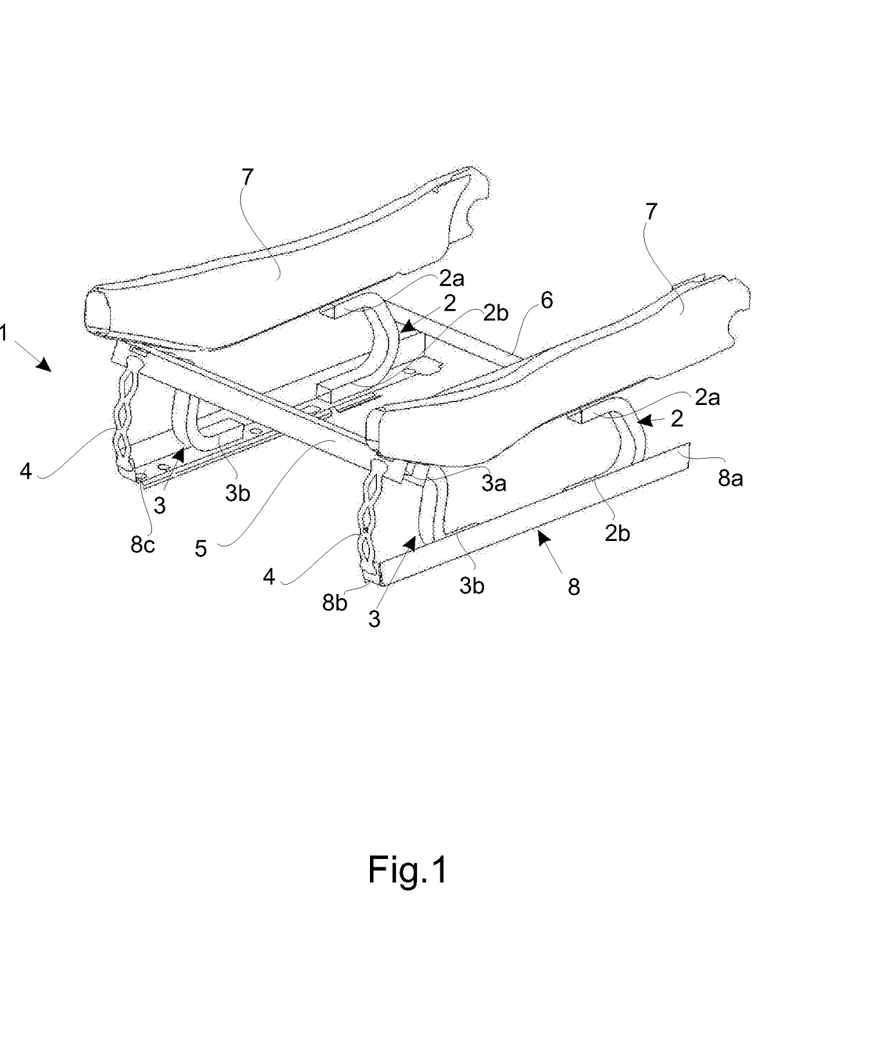
FIG. 1 is an outline drawing of an embodiment of a seat base according to the invention.

FIG. 1 is an outline drawing of an embodiment of the seat base 1 according to the invention, which has a pair of S-shaped elements 3 and a pair of U-shaped elements 2, two safety elements 4, two fastening rails 8, a U-profile 5, a reinforcement element 6 and two retaining elements 7.

Since the design of the seat base is divided into an identical right-hand and left-hand design as viewed in the width direction of the seat, only one side is described below.

The S-shaped element 3 has an upper end portion 3a and a lower end portion 3b in the vertical direction H of the seat. In this case the upper end portion 3a is mounted in a torsionally rigid and slip-free manner in the U-profile 5 or the U-profile carrier 5 respectively, in that the end portion 3a extends from outside through a wall of the U-profile 5 into the interior of the U-profile 5.

The U-profile 5 itself is fastened to the lower surface of the retaining elements 7, so that two walls of the U-profile extend substantially downwards from the lower surface of the retaining elements 7. The two retaining elements 7 are connected to each other by means of the U-profile 5.

The upper end portion of the safety element 4 in the vertical direction H of the seat, which end portion has for example a coupling region in the manner of an elongate hole for coupling the safety element 4 to the U-profile 5, is arranged in a preferably non-releasable manner on the wall of the U-profile which is opposite the wall through which the upper end portion 3a of the S-shaped element 3 extends. The lower end portion of the safety element 4, which likewise has for example a coupling region in the manner of an elongate hole for coupling the safety element 4 however to a floor region of the vehicle, preferably arranged in a non-releasable manner on a lateral wall 8b of the fastening rail which extends preferably at a right angle from the surface (not shown here) of the vehicle floor and which is orientated at a right angle to the lateral wall 8a of the fastening rail. The coupling regions in the manner of elongate holes are preferably orientated in different ways and allow the safety element 4 to absorb the flow of force preferably substantially in the longitudinal direction of the safety element 4.

In this case the safety element 4 is illustrated for example as a perforated metal sheet or perforated belt and is consequently an element capable of being deformed in a plastic manner. It has at least one first portion in which a plurality of substantially uniform perforations are formed which extend in the longitudinal direction of the safety element and are likewise arranged one behind the other in the longitudinal direction. It is also possible, however, for the perforations to be able to have different heights or length/width/height ratios. These perforations or bores or stamped-out portions respectively permit an expansion or extension or stretching or deformation respectively of the safety element 4 in the longitudinal direction of the safety element 4. It is advantageous for a perforated metal sheet 4 of this type to be produced in an inexpensive, reliable and rapid manner as a result of simple stamping of the perforations out of a flat material. It is additionally possible, however, for two or more corrugated components to be connected together in such a way that the troughs of the corrugations are opposite in each case on the one hand and the peaks of the corrugations are arranged against one other and/or rest against one other in each case on the other hand. The peaks of the corrugations are consequently preferably capable of being connected to one another in a positively locking and/or integral manner.

The perforated belt 4 has for example a perforation number of from 4 to 20 perforations, preferably from 3 to 25 and in a particularly preferred manner from 4 to 20 perforations. The width, height and length of the perforations and the thickness of the metal sheet of the perforated belt 4 can preferably be at any desired ratio to one another, so that for example a plurality of rows of perforations arranged adjacent to one another in the width direction of the perforated belt are also possible, in which case these rows of perforations can also for example be arranged offset from one another in the longitudinal direction of the perforated belt 4.

It is also possible, however, for the safety element 4 to have forms differing from this or even to be an element capable of being deformed in a resilient manner.

The lower portion 3b of the S-shaped element 3 is preferably arranged in a torsionally rigid, displacement-resistant and non-releasable manner on a wall 8c of the fastening rail 8 extending substantially parallel to the surface of the vehicle floor. This wall 8c is itself preferably connected in a torsionally rigid and displacement-resistant manner to the surface of the vehicle floor, in order to anchor the seat base or the person's seat to the vehicle or to the vehicle floor.

Since the retaining elements 7 in the embodiment as shown in FIG. 1 have in each case a rear region in the direction R of the seat, which rear region extends out of the surface of the vehicle floor at a defined angle, the upper end portions 3a of the respective S-shaped elements 3 also extend from the surface of the vehicle floor at this defined angle and consequently do not extend parallel to it, such as for example the lower end portions 3b of the respective S-shaped elements 3.

The U-shaped elements 2 are arranged in each case in front of the S-shaped elements 3 in the direction R of the seat and they likewise have an upper end portion 2a and a lower end portion 2b in the vertical direction H of the seat. The upper end portion 2a is arranged in a torsionally rigid, slip-free, and preferably also non-releasable manner on the lower surface of the retaining element 7 which extends substantially parallel to the surface of the vehicle floor. In a manner corresponding to the lower end portion 3b of the S-shaped element 3 the lower end portion 2b of the U-shaped element 2 is connected in a torsionally rigid, slip-free, and preferably non-releasable manner to the wall 8c of the fastening rail 8.

The end portions 2a and 2b of the U-shaped element extend towards the rear in the direction R of the seat, in which case the upper end portion 3a of the S-shaped element 3 extends at a defined angle out of the surface of the vehicle towards the rear and the lower portion 3b of the S-shaped element 3 extends forwards in the direction R of the seat. Accordingly, the two lower portions 2b and 3b of the U-shaped element 2 and of the S-shaped element 3 point to each other. As a result of this arrangement of the elements it would consequently also be possible for the two elements, namely the U-shaped element 2 and the S-shaped element 3, of each side of the seat to be produced and assembled from a continuous metal profile.

In order for example to increase the stability of the entire system of the seat base, a reinforcement element 6 for example is provided which extends substantially parallel to the surface of the vehicle floor from one U-shaped element 2 to the other U-shaped element 2 and is preferably also arranged in a preferably non-releasable manner on these elements 2. In this case the reinforcement element 6 itself can be for example a rod or a tube with a widely differing cross-sectional shape.

The retaining elements 7 are for example hollow profiles and are arranged on the lower surface of the seat part (not shown here) in the vertical direction H of the seat. In this case it is possible for the seat part to be able to slide backwards and forwards on the retaining elements 7 for example in the direction R of the seat possibly by guide rails (not shown here). It is also possible, however, for the seat part to be arranged in an immovable manner on the retaining elements.

Figure 2:
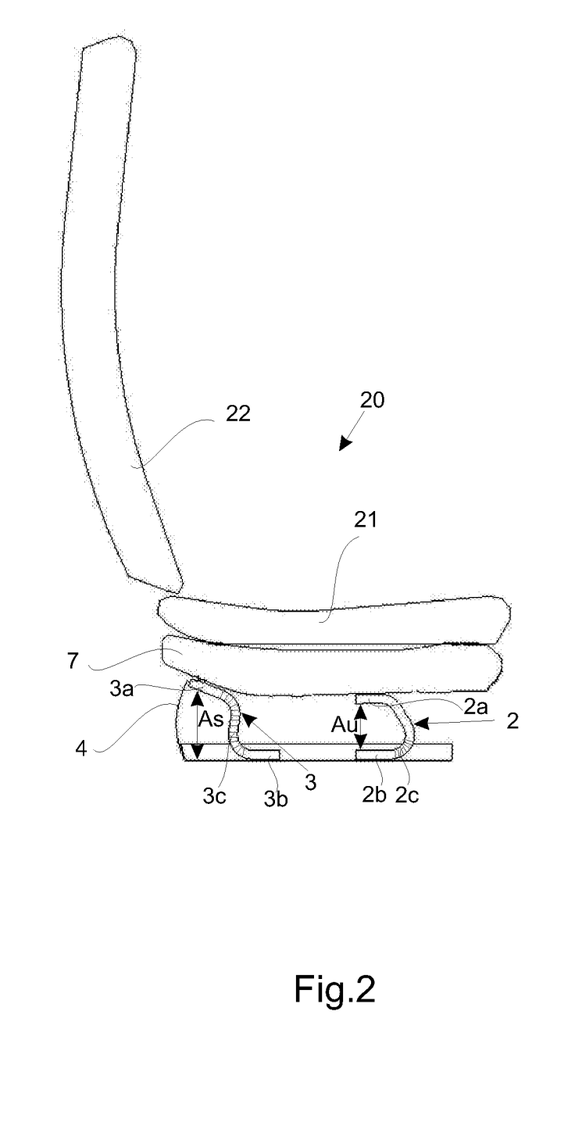
FIG. 2 is an outline drawing of a person's seat with an embodiment of the seat base according to the invention in a first position.

FIG. 2 is an outline drawing of a person's seat 20 with an embodiment of the seat base 1 according to the invention which substantially corresponds to the embodiment as shown in FIG. 1 but without the illustration of the reinforcement element and the U-profile, in a first position, i.e. in the initial position before an accident for example.

In this case the person's seat 20 has a seat part 21 and a backrest 22 as well as an embodiment of the seat base 1 according to the invention. In addition, the person's seat 20 or seat 20 could also have arm rests or a belt system etc. not explicitly specified in this case.

The safety element 4 has a slightly bent shape and is consequently not yet completely stretched. In addition, the S-shaped elements 3 and the U-shaped elements 2 are present in a shaped original state which is not yet deformed.

The S-shaped element 3 and the U-shaped element 2 have in each case an intermediate region 2c and 3c (hatched area) which is situated between the end portions 2a and 2b of the U-shaped element 2 and the end portions 3a and 3b of the S-shaped element 3 and which is deformed for example during an accident. This deformation is illustrated in a clarified manner in the following FIGS. 3 and 4.

Figure 3:
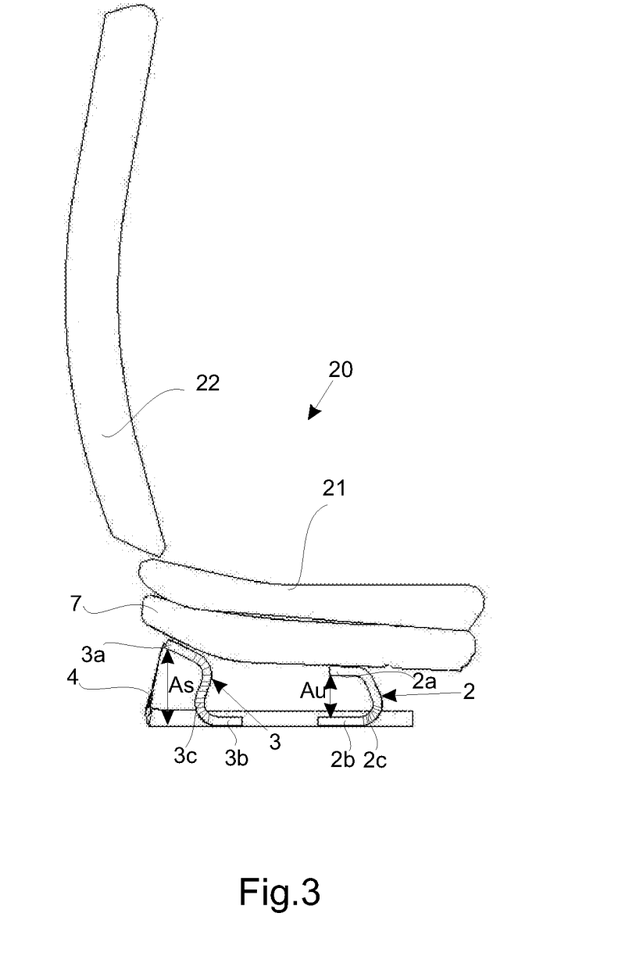
FIG. 3 is an outline drawing of a person's seat with an embodiment of the seat base according to the invention as shown in FIG. 2 in a second position.

Accordingly, FIG. 3 is an outline drawing of the person's seat as shown in FIG. 2 in a second position, i.e. in a starting state during an accident. In this case the seat 20 or the seat base 1 starts to compensate or to absorb the kinetic energy.

As compared with FIG. 2 it is clearly evident that the seat 20 or the seat part 21, the backrest 22 and the retaining elements 7 (in this case only one retaining element 7 is shown) are bent forwards in the direction R of the seat. Accordingly, the front region of the seat part 21 in the direction R of the seat drops downwards slightly in the vertical direction H of the seat, whereas the rear region of the seat part 21 is moved upwards slightly in the vertical direction H of the seat.

As a result, the distance $A_U$ between the upper end portion 2a and the lower end portion 2b of the U-shaped element 2 is reduced on the one hand, whereas the intermediate region 2c is pressed in the direction of the surface of the vehicle floor or in the direction of the fastening rail 8 on the other hand.

Consequently the U-shaped element 2 is acted upon with a pressing force.

In contrast, the S-shaped element 3 and the safety element 4 are acted upon with a tensile force, as a result of which on the one hand the safety element 4 is slightly stretched or extended until it has a straight shape, as shown in accordance with the illustration according to FIG. 3, and no longer a curved shape as illustrated in FIG. 2.

On the other hand, the S-shaped element 3 is also easily stretched or extended, so that the distance $A_S$ between the upper end portion 3a and the lower end portion 3b of the S-shaped element 3 is enlarged. Consequently the upper end portion 3a is moved outwards, i.e. substantially in the vertical direction H of the seat as well as in the direction R of the seat, as a result of which the upper S-curve is preferably widened, whilst the lower S-curve is curved to a pronounced degree.

Figure 4:
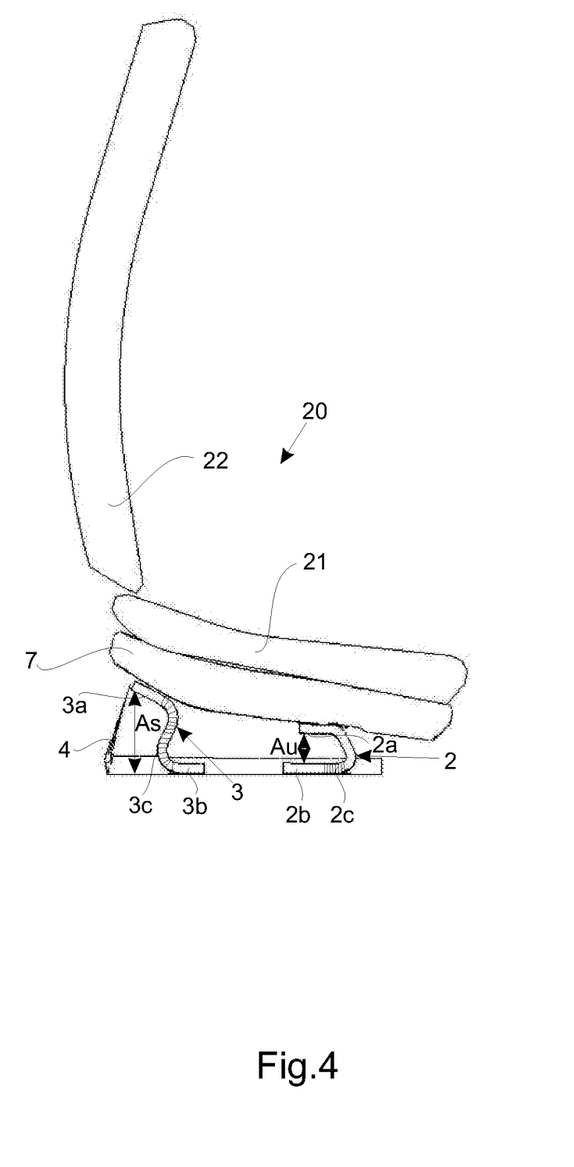
FIG. 4 is an outline drawing of a person's seat with an embodiment of the seat base according to the invention as shown in FIGS. 2 and 3 in a third position.

This deformation of the originally shaped S-curves or of the intermediate region 3c as well as the deformation of the U-shaped element 2 or of the intermediate region 2c become still clearer in FIG. 4 which shows a third position of the person's seat 20.

In the position shown in FIG. 4 the person's seat 20 or the embodiment of the seat base 1 according to the invention illustrated in this case has already absorbed the kinetic energy to the greatest degree. As compared with the position of FIG. 3, the person's seat 20 is inclined still further, so that the front region of the seat part 21 has been lowered still further in the vertical direction H of the seat and the rear region of the seat part 21 has been raised still further in the vertical direction H of the seat.

The safety element 4, which preferably has spherically or elliptically shaped perforations which produce as efficient a distribution of the flow of force as possible, has been additionally stretched and has been consequently extended or lengthened in the longitudinal direction thereof. This is, in particular, so that in this case the safety element 4 is stretched in the folded or corrugated or curved or angled or flat region respectively, in such a way that the maximum width of the safety element 4—in particular with a sustained predetermined load—and preferably the perforation width is reduced to an increasing degree, whereas the length of the safety element is enlarged to an increasing degree.

This means that the forces introduced in the form of tensile forces into the safety element 4 are or have been absorbed extremely efficiently by plastic deformation of the safety element 4.

In addition, the S-shaped element 3 or the intermediate region 3c has also been further deformed by the upper S-curve being bent further and by the lower S-curve being curved or compressed further. As a result, the distance $A_S$ between the upper end portion 3a and the lower end portion 3b has been further enlarged. This is caused by a tensile force which acts upon the safety element 4 and the S-shaped elements 3.

In contrast, the U-shaped elements 2 have been further acted upon with pressing force, as a result of which the distance $A_U$ between the upper end portion 2a and the lower end portion 2b has been further reduced as compared with FIG. 3. Consequently the entire intermediate region 2c is moved closer to the fastening rail 8 insofar as the aforesaid intermediate region 2c extends substantially parallel to the fastening rail and preferably rests on it or abuts against it. Accordingly, this intermediate region 2c is consequently "rolled" on the guide rail. Consequently the entire length of the lower end portion 2b, which extends substantially parallel to the guide rail 8, is lengthened.

As a result of this deformation of the tube elements 2, 3 and of the safety element 4, the kinetic energy can be absorbed in an optimum manner in the event of an accident and consequently the passenger (not shown here) sitting on the seat 20 is saved from serious injuries.

In this case the safety element is further described in a further patent application which was filed by the Applicants on the same day and which is hereby made the subject matter of the present patent application in its entirety by reference.

The Applicants reserve the right to claim all the features disclosed in the application documents as being essential to the invention, insofar as they are novel either individually or in combination as compared with the prior art.

LIST OF REFERENCES 1 seat base
2 U-shaped element
2a upper end portion of the U-shaped element
2b lower end portion of the U-shaped element
2c intermediate region of the U-shaped element
3 S-shaped element
3a upper end portion of the S-shaped element
3b lower end portion of the S-shaped element
3c intermediate region of the S-shaped element
4 safety element
5 U-profile
6 reinforcement element
7 retaining element
8 fastening rail
8a lateral wall of the U-profile
8b lateral wall of the U-profile
8c wall of the U-profile
20 seat
21 seat part
22 backrest
$A_S$ distance in the case of the S-shaped element
$A_U$ distance in the case of the U-shaped element
B width direction of the seat
H vertical direction of the seat
R direction of the seat

The invention claimed is:

1. A seat base of a person's seat with at least one backrest and one seat part to permit a controlled movement of the person's seat for the dissipation of kinetic energy and for the protection of the person sitting on the person's seat in the event of an accident taking place substantially in the direction of the seat, wherein the seat base comprises at least one pair of U-shaped tubular elements oriented sideways relative to an upright position and capable of being deformed, an upper end portion of each U-shaped tubular element, with respect to the height direction of the seat, characterized by an upper leg of the U-shaped tubular element arranged in a torsionally rigid manner substantially on a lower surface of the seat part and a lower end portion of each U-shaped tubular element, with regard to the height direction of the seat, characterized by a lower leg of the U-shaped tubular element arranged in a torsionally rigid manner substantially on an upper surface of a region of a vehicle floor on which the person's seat is arranged, wherein the U-shaped tubular element is non-symmetrical and has a single inflection point nearer the lower leg of the U-shaped tubular element than the upper leg of the U-shaped tubular element, and at least one pair of S-shaped tubular elements oriented upright and capable of being deformed, an upper end portion of each S-shaped tubular element, with respect to the height direction of the seat, is arranged in a torsionally rigid manner substantially on the lower surface of the seat part and a lower end portion of each S-shaped tubular element, with regard to the height direction of the seat, is arranged in a torsionally rigid manner substantially on the upper surface of the region of the vehicle floor, and wherein the pair of U-shaped tubular elements is arranged substantially in front of the pair of S-shaped tubular elements in the direction of the seat, wherein each end portion of the U-shaped tubular elements and the S-shaped tubular elements is fixedly secured in a non-rotatable manner.

2. The seat base according to claim 1, wherein individual elements of the pair of U-shaped tubular elements and the pair of S-shaped tubular elements are arranged at a distance from one another in each case in the width direction of the seat.

3. The seat base according to claim 1, wherein the seat base has at least one safety element extending substantially at a right angle between the seat part and the surface of the vehicle floor in order to absorb kinetic energy.

4. The seat base according to claim 3, wherein the safety element is arranged behind the pair of S-shaped tubular elements in the direction of the seat.

5. The seat base according to claim 3, wherein the safety element is capable of being deformed in a plastic manner in such a way that at least one region of the safety element is capable of being stretched in the longitudinal direction of the safety element.

6. The seat base according to claim 1, wherein the lower end portion of the S-shaped tubular element in the height direction of the seat extends substantially forwards in the direction of the seat and the upper end portion of the S-shaped tubular element in the height direction of the seat extends substantially towards the rear in the direction of the seat.

7. The seat base according to claim 1, wherein the two end portions of the respective U-shaped elements extend substantially towards the rear in the direction of the seat.

8. The seat base according to claim 1, wherein the U-shaped tubular elements are capable of being deformed in a plastic manner in each case in such a way that a distance between the respective upper end portion and lower end portion is essentially capable of being reduced and a length of the respective lower end portion which is situated substantially on the upper surface of the floor region of the vehicle is capable of being extended, so that a lower region of a bulging portion of the U-shaped elements is capable of being rolled on the upper surface of the floor region of the vehicle.

9. The seat base according to claim 1, wherein the S-shaped tubular elements are capable of being deformed in a plastic manner in each case in such a way that a distance between the respective upper end portion and lower end portion is essentially capable of being widened and an upper S-curve is preferably capable of being pulled up in each case.

10. The seat base according to claim 1, wherein the elements of the pair of U-shaped tubular elements and/or the pair of S-shaped tubular elements are tubes having a square cross-section.

11. The seat base according to claim 1, wherein the U-shaped tubular element and the S-shaped tubular element are produced from a continuous metal profile.

12. The seat base according to claim 3, wherein the safety element is an element capable of being deformed in a resilient manner.

13. The seat base according to claim 4, wherein the safety element is capable of being deformed in a plastic manner in such a way that at least one region of the safety element is capable of being stretched in the longitudinal direction of the safety element.

14. The seat base according to claim 5, wherein the safety element is an element capable of being deformed in a resilient manner.

* * * * *